(12) United States Patent
Huque et al.

(10) Patent No.: US 10,511,626 B2
(45) Date of Patent: Dec. 17, 2019

(54) PROTECTION AGAINST REROUTING A COMMUNICATION CHANNEL OF A TELECOMMUNICATION DEVICE HAVING AN NFC CIRCUIT AND A SECURE DATA CIRCUIT

(71) Applicants: STMICROELECTRONICS (ROUSSET) SAS, Rousset (FR); PROTON WORLD INTERNATIONAL N.V., Diegem (BE)

(72) Inventors: Thierry Huque, Grand-Rosiere (BE); Olivier Van Nieuwenhuyze, Wezembeek-Oppem (BE); Alexandre Charles, Auriol (FR)

(73) Assignees: STMicroelectronics (Rousset) SAS, Rousset (FR); Proton World International N.V., Zaventem (BE)

( * ) Notice: Subject to any disclaimer, the term of this patent is extended or adjusted under 35 U.S.C. 154(b) by 0 days.

(21) Appl. No.: 15/585,107

(22) Filed: May 2, 2017

(65) Prior Publication Data

US 2017/0237774 A1    Aug. 17, 2017

Related U.S. Application Data

(63) Continuation of application No. 13/996,458, filed as application No. PCT/FR2011/053023 on Dec. 16, 2011, now abandoned.

(30) Foreign Application Priority Data

Dec. 20, 2010    (FR) ..................... 10 60819

(51) Int. Cl.
*H04L 29/06*    (2006.01)
*H04W 12/06*    (2009.01)
(Continued)

(52) U.S. Cl.
CPC ...... *H04L 63/1466* (2013.01); *H04L 63/0245* (2013.01); *H04L 63/0492* (2013.01);
(Continued)

(58) Field of Classification Search
CPC ............... H04L 63/1466; H04L 63/083; H04L 63/0245; H04W 4/80; H04W 12/06; H04W 12/08
See application file for complete search history.

(56) References Cited

U.S. PATENT DOCUMENTS 6,070,243 A    5/2000    See et al.
6,092,191 A    7/2000    Shimbo et al.
(Continued)

FOREIGN PATENT DOCUMENTS

CN    1596018 A    3/2005
CN    1717705 A    1/2006
(Continued)

OTHER PUBLICATIONS

Smart Card Alliance, "Security of Proximity Mobile Payments," CPMC-09001, May 2009, 40 pages.
(Continued)

*Primary Examiner* — George Eng
*Assistant Examiner* — Hung K Du
(74) *Attorney, Agent, or Firm* — Seed IP Law Group LLP

(57) ABSTRACT

A method and associated circuits protect data stored in a secure data circuit of a telecommunication device equipped with a near-field communication (NFC) router, a microcontroller, and the secure data circuit. In the method, each message received with the NFC router is parsed to retrieve a communication pipe identifier and an instruction code. The communication pipe identifier and the instruction code are compared to corresponding information in a filter table. Instruction codes of particular messages that attempt to
(Continued)

modify a communication pipe by reassigning one end of the communication pipe from the port of the NFC router to a different circuit are acted upon. These messages are blocked from reaching the secure data circuit when the instruction code is not authorized in the filter table, and these messages are permitted when the instruction code is authorized in the filter table.

31 Claims, 3 Drawing Sheets

(51) Int. Cl.
  H04W 12/08 (2009.01)
  H04W 12/12 (2009.01)
  H04W 4/80 (2018.01)
(52) U.S. Cl.
  CPC .......... H04L 63/083 (2013.01); H04L 63/107 (2013.01); H04W 4/80 (2018.02); H04W 12/06 (2013.01); H04W 12/08 (2013.01); H04W 12/12 (2013.01)

(56) References Cited

U.S. PATENT DOCUMENTS

| | | | |
|---|---|---|---|
| 6,674,769 B1 | 1/2004 | Viswanath | |
| 7,587,044 B2 | 9/2009 | Kocher et al. | |
| 7,974,536 B2 | 7/2011 | Yu et al. | |
| 10,278,077 B2 | 4/2019 | Huque et al. | |
| 2004/0065735 A1 | 4/2004 | Christoffers et al. | |
| 2004/0177158 A1 | 9/2004 | Bauch et al. | |
| 2004/0232220 A1 | 11/2004 | Beenau et al. | |
| 2005/0013310 A1 | 1/2005 | Banker et al. | |
| 2005/0251652 A1* | 11/2005 | Nallusamy | G06F 9/4484 712/209 |
| 2006/0031933 A1 | 2/2006 | Costa et al. | |
| 2006/0213972 A1 | 9/2006 | Kelley et al. | |
| 2007/0006314 A1 | 1/2007 | Costa et al. | |
| 2007/0186097 A1 | 8/2007 | Arditti et al. | |
| 2007/0263596 A1 | 11/2007 | Charrat | |
| 2007/0282951 A1* | 12/2007 | Selimis | H04L 67/06 709/205 |
| 2008/0085001 A1 | 4/2008 | Charrat et al. | |
| 2008/0219444 A1 | 9/2008 | Benteo et al. | |
| 2008/0296978 A1 | 12/2008 | Finkenzeller et al. | |
| 2009/0106824 A1 | 4/2009 | Morel et al. | |
| 2009/0206984 A1* | 8/2009 | Charrat | H04L 63/08 340/5.2 |
| 2010/0084465 A1 | 4/2010 | Jolivet | |
| 2010/0090805 A1 | 4/2010 | Libotte | |
| 2010/0137025 A1 | 6/2010 | Tal et al. | |
| 2010/0161403 A1 | 6/2010 | Fisher et al. | |
| 2010/0178867 A1 | 7/2010 | Charrat | |
| 2010/0178868 A1 | 7/2010 | Charrat | |
| 2010/0210300 A1 | 8/2010 | Rizzo et al. | |
| 2010/0227553 A1 | 9/2010 | Charrat et al. | |
| 2010/0245054 A1 | 9/2010 | Kim | |
| 2010/0259216 A1 | 10/2010 | Capomaggio | |
| 2010/0274677 A1 | 10/2010 | Florek et al. | |
| 2010/0325300 A1 | 12/2010 | Vasters et al. | |
| 2011/0065398 A1 | 3/2011 | Liu et al. | |
| 2011/0226853 A1 | 9/2011 | Soh et al. | |
| 2011/0237190 A1 | 9/2011 | Jolivet | |
| 2011/0269423 A1 | 11/2011 | Schell et al. | |
| 2011/0320825 A1* | 12/2011 | Greiner | G06F 9/30003 713/190 |
| 2012/0052801 A1 | 3/2012 | Kulkarni | |
| 2012/0190299 A1 | 7/2012 | Takatsuka et al. | |
| 2012/0190332 A1 | 7/2012 | Charles | |
| 2013/0057640 A1 | 3/2013 | Callahan | |
| 2013/0059563 A1 | 3/2013 | Huque et al. | |
| 2013/0059566 A1 | 3/2013 | Huque et al. | |
| 2013/0059567 A1 | 3/2013 | Huque et al. | |
| 2013/0059568 A1 | 3/2013 | Huque et al. | |
| 2013/0217325 A1 | 8/2013 | Ingels | |
| 2013/0225125 A1 | 8/2013 | Hugue et al. | |
| 2014/0041036 A1 | 2/2014 | Huque et al. | |
| 2014/0201815 A1 | 7/2014 | Van Nieuwenhuyze et al. | |
| 2014/0289833 A1 | 9/2014 | Briceno et al. | |

FOREIGN PATENT DOCUMENTS

| | | |
|---|---|---|
| CN | 1933351 A | 3/2007 |
| CN | 101079013 A | 11/2007 |
| CN | 101202621 A | 6/2008 |
| CN | 101491052 A | 7/2009 |
| CN | 101536008 A | 9/2009 |
| CN | 101192922 B | 5/2010 |
| CN | 101241541 B | 8/2010 |
| CN | 101299698 B | 5/2012 |
| EP | 1 909 431 A1 | 4/2008 |
| EP | 1 928 099 A1 | 6/2008 |
| EP | 2 034 705 A1 | 3/2009 |
| EP | 2 219 353 A1 | 8/2010 |
| EP | 1 763 199 B1 | 1/2017 |
| FR | 2 770 316 B1 | 6/2000 |
| FR | 2 903 549 A1 | 1/2008 |
| FR | 2 921 786 A1 | 4/2009 |
| WO | 2007/068993 A1 | 6/2007 |
| WO | 2007/093580 A1 | 8/2007 |
| WO | 2009/115997 A2 | 9/2009 |
| WO | 2009/147094 A1 | 12/2009 |

OTHER PUBLICATIONS

ETSI, 102 695-2 V7.2.0, "Smart Cards; Test specification for the Host Controller Interface (HCI); Part 2: UICC features," Technical Specification, Oct. 2010, 62 pages.
ETSI TS 102 613 V7.3.0, "Smart Cards; UICC—Contactless Front-end (CLF) Interface; Part 1: Physical and data link layer characteristics (Release 7)," Technical Specification, Sep. 2008, 57 pages.
ETSI, 102 622 V7.4.0, "Smart Cards; UICC—Contactless Front-end (CLF) Interface; Host Controller Interface (HCI)," Technical Specification, Apr. 2009, 53 pages.
ETSI TS 102 622 V7.5.0, "Smart Cards; UICC—Contactless Front-end (CLF) Interface; Host Controller Interface (HCI) (Release 7)," Technical Specification, Jun. 2009, 53 pages.
ETSI, 102 622 V7.5.0, "Smart Cards; UICC—Contactless Front-end (CLF) Interface; Host Controller Interface (HCI)," Technical Specification, Jun. 2009, 53 pages.
ETSI, 102 622 V10.2.0, "Smart Cards; UICC—Contactless Front-end (CLF) Interface; Host Controller Interface (HCI)," Technical Specification, Mar. 2011, 56 pages.
ETSI TS 103 613 V1.1.1, "Intelligent Transport Systems (ITS); Access layer specification for Intelligent Transport Systems using LTE Vehicle to everything communication in the 5,9 GHz frequency band," Technical Specification, Nov. 2018, 18 pages.
Francis et al., "Potential Misuse of NFC Enabled Mobile Phones with Embedded Security Elements as Contactless Attack Platforms," *International Conference for Internet Technology and Secured Transactions*, London, United Kingdom, Nov. 9-12, 2009, 8 pages.
Haselsteiner et al., "Security in Near Field Communication (NFC)," Workshop on RFID Security, 2006, 11 pages.
ISO/IEC 14443-3, "Identification Cards—Contactless integrated circuit cards—Proximity cards—Part 3: Initialization and anticollision," International Standard, Third Edition, Corrected Version, Sep. 1, 2016, 70 pages.
ISO/IEC 15693-1, "Identification cards—Contactless integrated circuit(s) cards—Vicinity Integrated Circuit(s) Card Part 1: Physical characteristics," International Standard, Final Committee Draft, 2000, 79 pages.
ISO/IEC 18092, "Information technology—Telecommunications and information exchange between systems—Near Field Communication—Interface and Protocol (NFCIP-1)," International Standard, Second Edition, Mar. 15, 2013, 52 pages.
ISO/IEC 21481, "Information technology—Telecommunications and information exchange between systems—Near Field Commu-

(56) References Cited

OTHER PUBLICATIONS nication Interface and Protocol-2 (NFCIP-2)," International Standard, Second Edition, Jul. 1, 2012.
ISO/IEC 7816-4, "Identification cards—Integrated circuit cards—Part 4: Organization, security and commands for interchange," International Standard, Second Edition, Jan. 15, 2005, 90 pages.
ISO/IEC 7816-4, "Identification cards—Integrated circuit cards—Part 3: Electrical interface and transmission protocols," International Standard, Third Edition, Nov. 1, 2006, 58 pages.
Madlmayr et al., "Management of Multiple Cards in NFC-Devices," *Proceedings of the $8^{th}$ IFIP WG 8.8/11/2 International Conference on Smart Card Research and Advanced Applications*, London, United Kingdom, Sep. 8-11, 2008, pp. 149-161. (14 pages).
Madlmayr et al., "NFC Devices: Security and Privacy," *Third International Conference on Availability, Reliability and Security*, Barcelona, Spain, Mar. 4-7, 2008, pp. 642-647.
Mulliner, "Attacking NFC Mobile Phones," EUSecWest Conference, London, United Kingdom, May 2008, 71 pages.
Mulliner, "Vulnerability Analysis and Attacks on NFC-enabled Mobile Phones," International Conference on Availability, Reliability and Security, 2009, 6 pages.
Pasquet et al., "'Payment with mobile NFC phones': How to analyze the security problems," *2008 International Symposium on Collaborative Technologies and Systems*, Irvine, California, USA, May 19-23, 2008, 8 pages.
Rieback et al., "Keep on Blockin' in the Free World: Personal Access Control for Low-Cost RFID Tags," in Christianson et al. (eds.), *Security Protocols 2005*, Springer-Verlag, Berlin, Germany, 2007, pp. 51-59. (10 pages).
Van Damme et al., "Practical Experiences with NFC Security on mobile Phones," Workshop on RFID Security, 2009, 37 pages.

\* cited by examiner

PROTECTION AGAINST REROUTING A COMMUNICATION CHANNEL OF A TELECOMMUNICATION DEVICE HAVING AN NFC CIRCUIT AND A SECURE DATA CIRCUIT

CROSS REFERENCE TO RELATED APPLICATIONS

This application is a continuation of U.S. Ser. No. 13/996,458, filed Aug. 29, 2013, which is a U.S. National Stage patent application based on International patent application number PCT/FR2011/053023, filed Dec. 16, 2011, which claims the priority benefit of French patent application number 10/60819, filed Dec. 20, 2010, which applications are hereby incorporated by reference to the maximum extent allowable by law.

BACKGROUND

Technical Field

The present disclosure generally relates to transactions performed by means of mobile telecommunication devices of cell phone type. The present disclosure more specifically applies to such devices, further equipped with a near field communication circuit (NFC).

Discussion of the Related Art

Cell phones are more and more often equipped with a near-field communication interface which enables them to combine electromagnetic transponder functions with mobile telephony functions. In particular, this adds functions of emulation of an electromagnetic transponder, of contactless or contactless card reader type to the mobile telecommunication device, for example a personal digital assistant, a cell phone, a smartphone, etc. This considerably enhances the features of the mobile device, which can then be used, for example, as an electronic purse, as an access or transport ticket validation device, etc.

To emulate the operation of a contactless chip card, the mobile telecommunication device is equipped with a contactless front-end integrated circuit (CLF), also called NFC router. This router is equipped with a radio frequency (RF) transceiver front head associated with a low-range antenna to communicate like an electromagnetic transponder. The router uses the capacities of the processor(s) of the mobile device for data processing and storage operations. For access control, electronic purse, payment, and other applications, a secure element enabling to authenticate the user is used. This secure element is either integrated to the mobile telecommunication device (dedicated integrated circuit, circuit welded to the printed circuit board) or contained in a microcircuit supported by a subscriber identification module (SIM), or any other removable card, for example, in the standard format of a memory card.

An NFC router may also be present in a mobile device of USB key type, in a bank teller terminal, in an adhesive device (sticker), etc.

An emulation of a contactless card in a mobile telecommunication device is capable of generating weak points in terms of transaction security.

It would be desirable to be able to detect such weak points.

It would further be desirable to avoid such weak points to secure transactions.

SUMMARY

Embodiments overcome all or part of the disadvantages of mobile telecommunication devices associated with a near-field transmission module.

Another embodiment improves the security against a hacking attempt on a security module of subscriber identification module type, contained in a telecommunication device associated with a near-field transmission module.

Another embodiment provides a method for detecting an attempt at diversion of a communication pipe between a port of a security module and a port of a near-field communication router present in a telecommunication device, wherein the router filters the messages addressed to said security module.

According to an embodiment, the message comprises at least one pipe identifier and one instruction code, the router comparing the instruction code with authorized codes that it contains.

According to an embodiment, the router compares the format of the data of the message with authorized formats that it contains.

According to an embodiment, the router comprises a table containing, for each type of control signal that may be received, an authorization or denial code.

An embodiment also provides a method of secure data transmission in a telecommunication device.

An embodiment also provides a near-field communication router.

An embodiment also provides a telecommunication device equipped with a near-field communication router.

BRIEF DESCRIPTION OF THE DRAWINGS

The foregoing and other objects, features, and advantages of the present disclosure will be discussed in detail in the following non-limiting description of specific embodiments in connection with the accompanying drawings.

DETAILED DESCRIPTION

Figure 1:
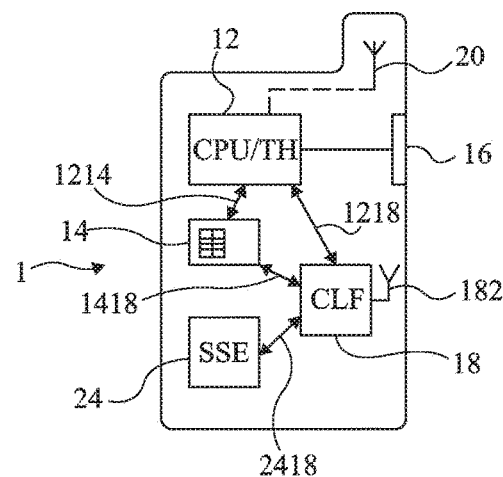
FIG. 1 schematically shows a mobile telecommunication device of the type to which the present disclosure applies as an example.

The same elements have been designated with the same reference numerals in the different drawings. For clarity, only those elements and steps which are useful to the understanding of the present disclosure have been shown and will be described. In particular, the coding and communication protocols, be it for near-field transmissions or for telecommunications in GSM mode, have not been detailed, embodiments being compatible with usual protocols. Further, the circuits forming the mobile communication device have not been detailed either, the embodiments being here again compatible with usual programmable devices.

FIG. 1 very schematically shows a mobile telecommunication device (for example, a cell phone) of the type to which the embodiments apply as an example. The different elements of interface with the user (keyboard, display, speaker, etc.) have not been shown, since these elements are not modified by the implementation of the embodiments which will be described.

Device 1 comprises a central processing unit 12 (CPU/TH) formed of at least one microcontroller forming the device core. This microcontroller is referred to as a terminal host. For the telecommunication operation over a network (GSM, 3G, UMTS, etc.), the microcontroller uses identification and authentication data provided by a subscriber identification module 14 (SIM) which forms a security module of the device. Microcontroller 12 is capable of using one or several internal memories, not shown, of the telephone. Telephone 1 may also comprise a memory card reader 16 or other buses of communication with the outside to load data and/or applications into the telephone.

Mobile devices to which the described embodiments apply combine the telecommunication function with that of a near-field contactless transmission system (NFC). To achieve this, device 1 comprises a circuit 18 (CLF—ContactLess Front-End) forming a near-field communication module like an electromagnetic transponder. Module 18, also called NFC router, is associated with an antenna 182 distinct from an antenna 20 intended for the mobile telephony network. Circuit 18 may be associated with a security module (SSE) 24 distinct from SIM card 14 and directly present on the printed circuit board of the telephone, or supported by a removable microcircuit card (for example, in the format of a memory card). A security module is an electronic circuit for securely executing applications and guaranteeing the security (secret/integrity) of data manipulated by such applications.

The different elements of device 1 communicate according to various protocols. For example, circuits 12 and 18 communicate over a link 1218 of I2C or SPI type, SIM card 14 communicates with microcontroller 12 over a link 1214 according to ISO standard 7816-3, and security module 24 communicates with router 18 according to this standard over a link 2418. Router 18 communicates with the SIM card, for example, over a single-wire bus 1418 (SWP—Single Wire Protocol). Other versions of protocols and links are of course possible.

The embodiments will be described in relation with a GSM telephone. The embodiments, however, more generally applies to any telecommunication device adapted to a mobile network (for example, Wifi, Bluetooth, WiMax, etc.) and associated with a contactless transmission module (NFC router), for example, a USB key, a bank terminal, a power consumption meter, or other), an access or transport ticket validation terminal, etc.

Similarly, the near-field communication module will be referred to as a router since it generally integrates all the functions useful for the emulation of a contactless card within a same circuit, the described embodiments however applying to any NFC-type module.

Router 18 comprises physical terminals of connection to links 1218, 1418, and 2418 and manages logic gates for assigning these terminals to the different functions associated with near-field communications. Router 18 thus comprises a processor and volatile and non-volatile memories for storing, among others, a routing table for the different logic gates. Some gates are reserved for router administration functions while others can be freely assigned by the router.

In operation, router 18 makes available and manages different pipes of communication with the other circuits 12, 14, 24, etc. of the mobile device to provide these circuits access to the near-field communication functions, that is, to gates connected to radio frequency transmission circuits, called RF gates.

Figure 2:
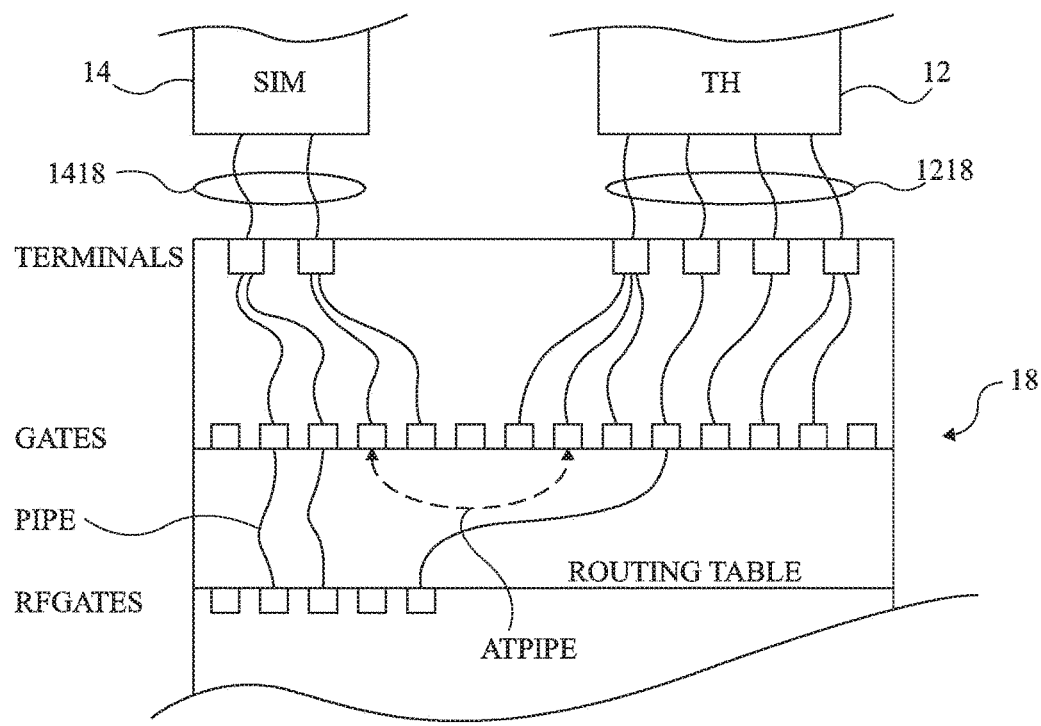
FIG. 2 is a diagram illustrating a function of a near-field transmission module of the device of FIG. 1.

FIG. 2 very schematically illustrates, in the form of blocks, the routing function of router 18. For simplification, FIG. 2 is a structural representation while, in practice, the assignment of the different gates to the different circuits of the mobile device is a software operation performed by the routing table.

Each of the router terminals (TERMINALS) is assigned one or several gates (GATES). In the example of FIG. 2, it is assumed that physical links 1418 and 1218 of SIM card 14 and of microcontroller 12 are connected to terminals of router 18 and that gates are assigned to these circuits. Several gates may be assigned to a same circuit (which is symbolized in FIG. 2 by the connection of a same terminal to several gates). The routing table (ROUTING TABLE) of router 18 assigns some gates to internal functions (for example, configuration and administration functions), but also creates pipes (PIPE) between some gates assigned to the SIM card or to the RF microcontroller, and gates (RF-GATES) comprised in module 18. This corresponds to the creation of pipes (PIPE) between the circuits external to router 18 and its RF transmission circuits for the implementation of the different applications requiring a near-field communication. For example, in bank, transport, electronic purse, access, and other applications which require a secure identification or authentication of the user, one or several pipes are created between the router and the SIM card to use the secure user identification data and validate the transaction.

The integration of NFC routers in mobile telecommunication devices and the sharing of the same security module (SIM card) generate weak points in terms of security.

Authentication tools may be provided to make sure that the links between the router and the different external circuits are not pirated. However, this appears to be insufficient in view of a weak point that the present inventors have identified and which will be described hereafter.

Router or NFC module 18 generally is a single integrated circuit and its external accesses are rather well protected against possible hacking attempts.

Up to now, the main concern has been to guarantee that a near-field transaction emulated by the mobile device would not enable a pirate device intercepting the near-field communication to exploit data provided by the security module.

However, there remains a risk, since router 18 also manages a pipe (ATPIPE symbolized in dotted lines in FIG. 2) of communication between SIM card 14 or any other security module and microcontroller 12 of the mobile telecommunication device. This pipe is normally used so that SIM card 14 informs microcontroller 12 that a message reaches it over the NFC link. It is however also possible to divert this use to make security module 14 believe that it communicates with the router for a near-field transaction and thus over a pipe with the RF gates of the telephone, while it is actually communicating with microcontroller 12.

Figure 3:
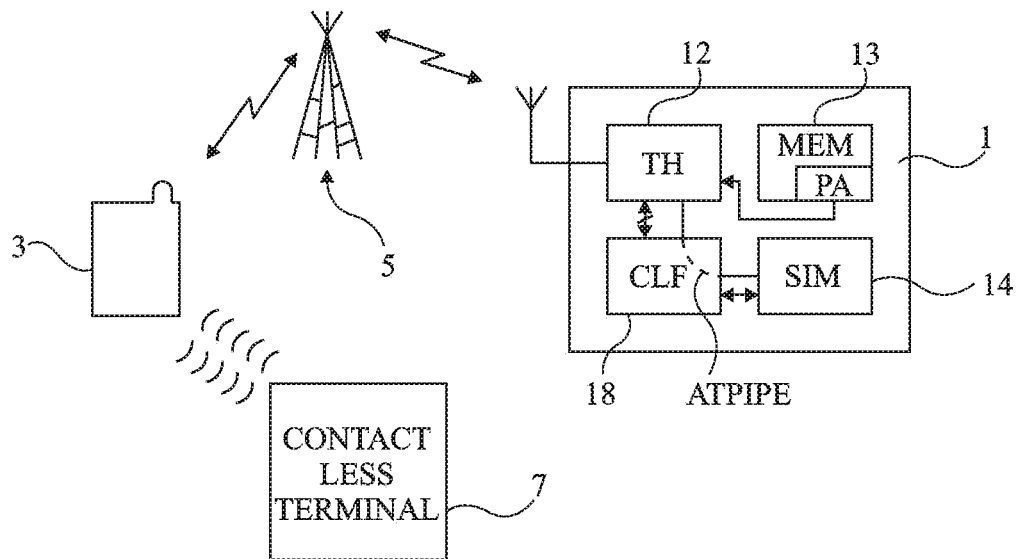
FIG. 3 very schematically illustrates an attack capable of exploiting a weakness of the telecommunication device of FIG. 1.

FIG. 3 very schematically illustrates in the form of blocks the possible exploitation of a pipe ATPIPE between a SIM card 14 and a microcontroller 12 of a cell phone 1.

It is assumed that, in a preparatory phase of the attack, GSM phone 1 has been hacked and a pipe ATPIPE has been diverted via router 18 between its SIM card 14 and its microcontroller 12. The routing table of router 18 thus contains the data of the "diverted" pipe. It is also assumed that a pirate application (PA) has been stored in a memory 13 (MEM) of phone 1 and that this application may provide instructions to microcontroller 12. Several embodiments of the preparatory phase will be discussed subsequently. The user of device 1, once it has been hacked by the loading of application PA and by the creation of pipe ATPIPE, is not capable, as will be seen hereafter, to notice a malfunction. He uses his telephone normally.

One of the functions of application PA is to automatically trigger a response of phone 1 after a request originating from the telecommunication network and transmitted by another mobile device 3 owned by the attacker. The pirate device for example is another GSM phone 3 which uses its own subscriber identification module to communicate over the GSM network (symbolized by a relay antenna 5). It may also be a microcomputer associated with a GSM module.

In the example of FIG. 3, device 3 is also equipped with a contactless router, for example, to initiate near field transactions with a terminal 7 (for example, an NFC terminal or any other contactless communication terminal). For example, device 3 is used to make a purchase with a payment to be validated by its NFC router.

Normally, for such a payment, the router of telephone 3 manages a communication pipe with the subscriber identification module (or another dedicated security module) of this telephone to authenticate the user and validate the payment.

In the mechanism of FIG. 3, at the payment validation, telephone 3 uses the GSM network to ask telephone 1 to validate the payment by means of its subscriber identification module. For example, device 3 sends an SMS over network 5 which, when received by telephone 1, is processed by the pirate application. Said application simulates requests from the RF gates and transmits them over pipe ATPIPE, so that identification module 14 responds and validates the transaction. This validation is diverted by microcontroller 12 and is sent back to device 3 which, in turn, transmits it to its NFC router to validate the payment for terminal 7. As a result, the payment is debited to the subscriber of telephone 1 and not to the attacker owning device 3. Most often, a contactless application requires no interaction with the terminal (7, FIG. 3) except for a presentation of a contactless device. In particular, no PIN keying is required for a near-field communication to avoid lengthening the transactions, so that device 3 may easily hack distant device 1.

The countermeasures providing encryptions and/or signatures between terminal 7 requesting the authentication and the security module are ineffective to counter this attack. Indeed, the data between terminal 7 and module 14 need no decoding. A communication pipe has actually been established between module 14 of telephone 1 and terminal 7 via telecommunication network 5, so that module 14 behaves as if it was in near field transaction with terminal 7.

The same type of piracy may occur for passage authentication or validation applications, of secure access type.

Further, this attack may also be successful even without for pirate device 3 to use its own NFC router, for example, if it uses a contactless communication mode, provided for the requested authentication to originate from a security module and to respect the formats and protocols used by the NFC protocol. Further, such an attack may be used to divert any data from device 1 in favor of a pirate system (for example, data duplicating the content of the magnetic track of a card in a bank payment application).

Further, the attack may involve the SIM card of cell phone 1 or of any other security module (for example, module 24), provided for a pipe to be managed by router 18 between this module and a circuit (generally, microcontroller 12) capable of managing communications over network 5.

This attack on near-field transactions, exploiting the telecommunication network, is due to the presence of a communication pipe, via the NFC router, between a security module and a microcontroller connected to this router.

Implementing the attack requires a preparatory phase in which an intervention of the telephone 1 which is desired to be pirated is necessary. This preparation requires an intervention depending on the security level provided by the SIM card to the management of the NFC communication pipes.

In a simplified embodiment, the microcontroller is allowed to create a pipe on any free gate. In this case, a pirate application loaded into the microcontroller is capable of creating a pipe through the NFC router to the SIM card. If, afterwards, the SIM card performs no other checking than to acknowledge that the format of the requests corresponds to the format of a radio frequency frame originating from an NFC circuit, the pirate application may attack the SIM card. According to another embodiment, security module 14 is more advanced and checks the association between the numbers of the pipes or of its own gates and the RF gates.

In a first case, it is considered that SIM card 14 does not take into account the circuit with which the gate is created (and thus, the fact that it may be a gate intended for the microcontroller). This embodiment exploits the fact that the assignment of the pipe numbers (identifiers) is often sequential. It is first started by asking the microcontroller to suppress a pipe between the SIM card and the RF gates. Then, a pipe having the same identifier is created between the microcontroller and the SIM card.

Figure 4:
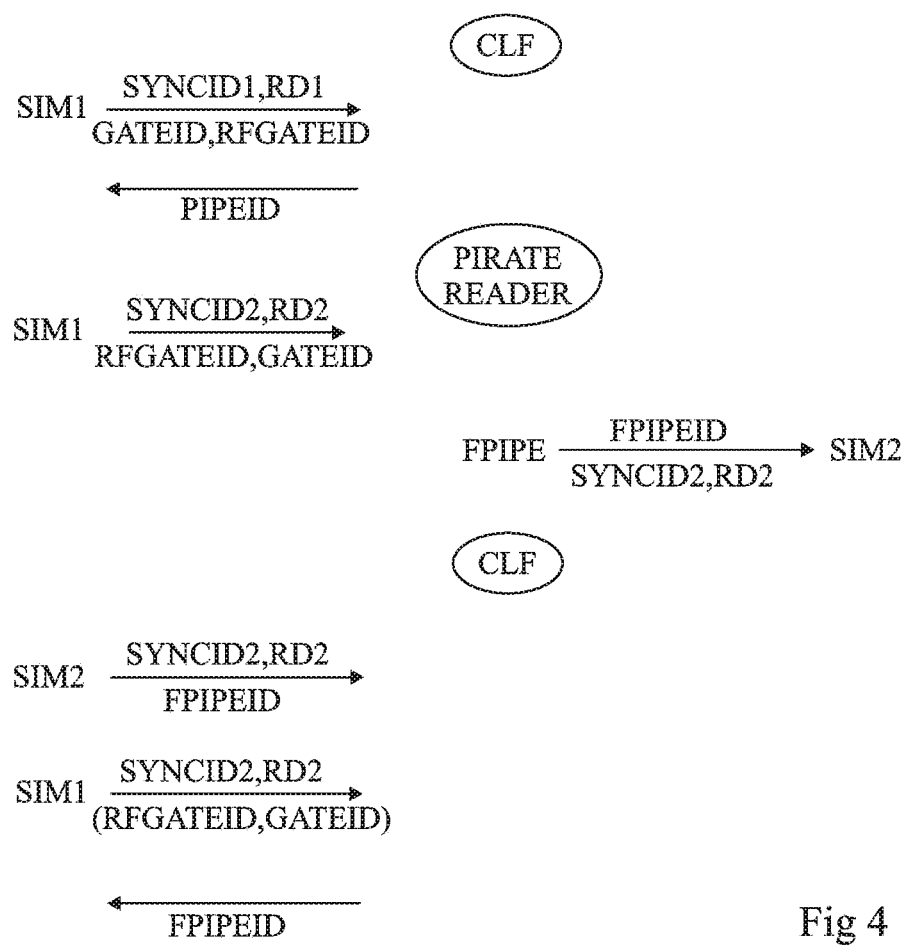
FIG. 4 illustrates an embodiment of a preparatory phase of such an attack.

FIG. 4 illustrates another embodiment of a preparatory phase of the attack aiming at diverting a pipe between router 18 (CLF) and the SIM card (SIM1) of a user. This embodiment is more specifically intended for systems in which the SIM card makes sure, before transmitting data to the CLF router, that it has effectively controlled the creating of the communication pipe therewith.

The fact that, prior to the initialization of device 1, the SIM card checks whether it has already been in the presence of router 18 is exploited herein. If it has not, it reconfigures the pipes between its gates and the NFC router.

In a normal operation, at the first connection of card SIM1 in telephone 1, the card causes the creating, at the level of the so-called transport layer, of at least one communication pipe, identified as SYNCID1, with the CLF router. For this purpose, card SIM1 sends to the CLF router both synchronization data SYNCID1 and a number (typically, a random number RD1). Number RD1 is stored in the CLF router and is used by card 14 to check that it has already caused the creation of pipe with this router. On each initialization, the card verifies the existence of number RD1 in the router. To achieve this, the card requests from the router to create a pipe between one of its gates, identified as GATEID, and one of the RF gates, identified as RFGATEID. The router then creates a pipe and assigns it an identifier PIPEID and, at the same time, stores said identifier in the routing table and communicates it to card SIM1. Each time data are requested by the router, card SIM1 verifies that identifier PIPEID of the pipe is correct.

To implement the attack, the hacker should have cell phone 1 and card SIM1 in his possession for a period of time. This is relatively easy, for example, by asking the owner of the cell phone to lend it to supposedly make a call, or by fraudulently using a phone during a maintenance operation, for example, in a mobile telephony shop.

With card SIM1 and the telephone provided with router 1, the pirate starts by introducing card SIM1 into a pirate device (PIRATE READER), for example, another cell phone having a microcontroller capable of executing a piracy program complying with the described functions, or a computer provided with a card reader and simulating a router. Since card SIM1 has never met the NFC router of the pirate device or emulated by said device, it generates a new synchronization identifier SYNCID2. It sends back gate identifiers RFGATEID and GATEID to create the corresponding pipes. The pirate router then assigns, to at least one pair of gates, a pipe FPIPEID which corresponds to a gateway between the router and an external gate of the microcontroller instead of associating gate GATEID to an RF gate. Identifier FPIPEID and identifiers SYNCID2 and RD2 are then loaded into a falsified card SIM2. Card SIM2 then contains a routing table associating gates RFGATEID and GATEID with pipe FPIPEID.

Then, card SIM2 is introduced into telephone 1. Identifiers SYNCID2 and RD2 are then transferred to CLF router 18 to create pipe FPIPEID between gates designated as GATEID and RFGATEID. This amounts to modifying the routing table of the router so that when the pipe between gates GATEID and RFGATEID is called, the assigned pipe is pipe FPIPEID instead of PIPEID.

The assignment of pipe FPIPEID may take various forms according to the way in which the pipes are assigned to the gates in the router. For example, a phase of observation of the gate assignment is gone through by placing card SIM2 in the router to observe the pipe assignment method, before introducing card SIM2 into the pirate reader.

The "real" card SIM1 is then placed back into telephone 1. Since the CLF router knows identifiers RD2 and SYNCID2, the card considers that it "knows" the router and does not recreate pipes therewith. When card SIM1 requests a communication towards gate RFGATEID, the router uses the assigned pipe FPIPEID.

The GSM terminal has effectively been hacked, that is, a pipe FPIPE (or ATPIPE, FIG. 2) has been created between a gate GATEID of the SIM card and a gate of microcontroller 12, while card SIM1 believes that this pipe connects its gate GATEID to gate RFGATEID. This pipe can then be diverted for a distant access over the GSM network from another terminal (FIG. 3). The downloading of pirate application PA can be performed either subsequently or at the same time as the pirate pipe generation.

There are various possibilities, depending on device 1. For example, the routing table may be read from. If this is not possible, it is possible, when card SIM1 is in the pirate reader, to emulate an operation of the CLF circuit, in order to obtain the full configuration stored in this card. A pirate card SIM2 or a card emulator may also be used to extract the data from the routing table in valid phone 1.

It can thus be seen that it is possible to parameterize the diverting of a communication pipe between a security module and an NFC router to establish a pipe between this module and the telephone microcontroller, external to the NFC router.

So that the user of telephone 1 does not notice the piracy, even when he uses his contactless mode, the pirate application must comprise the function of redirecting pipe FPIPE towards the RF circuits of the router when a data request towards the SIM is transmitted by router 18.

Figure 5:
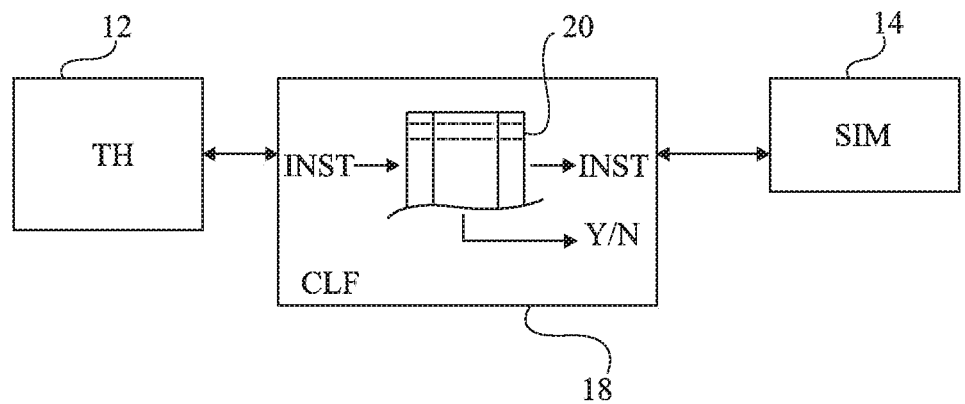
FIG. 5 illustrates an embodiment of a method of protection against such an attack.

FIG. 5 partially shows in the form of blocks an embodiment of a mobile telecommunication device according to an embodiment.

As in FIG. 1, it features a central processing unit 12 (TH—Terminal Host) capable of communicating with a contactless router 18 (CLF), itself capable of exchanges with a security module 14 (for example, a SIM card). Usually, router 18 comprises a routing table (not shown) putting a pipe identifier PIPEID in correspondence with two gate identifiers GATEID between which the pipe is created.

According to the embodiment of FIG. 1, the router further comprises an interception module 20 comprising a filtering table containing, for each pipe (PIPE), between the router and the SIM card, parameters enabling the router to determine whether a message or an instruction addressed to the SIM card is to be authorized or not (Y/N). Thus, the router is modified to intercept all requests of pipe creation with secure module 14. The table preferably also contains data relative to the events authorized on the pipe, which enables to refine the selection of the permitted functions.

More generally, a filtering table is provided for each security module connected to the router, for example, the microcontroller, another security element, etc.

Usually, an instruction INST transiting through router CLF comprises the pipe over which the message is to be transmitted the type of message, an actual instruction code and, possibly, data. This message is intercepted by the filter comprised within the CLF router before allowing its transmission to the SIM card.

According to an embodiment, all messages going from the microcontroller to the SIM card (or any other security module) are blocked by the router based on a specific instruction code (for example, the code known as HTP) or on the combination of the table and of the parameter format of this instruction. Messages are thus limited to those between the actual telephone central processing unit and the SIM card, which respect the expected instruction format. Now, to implement the above-described attack, messages meaning nothing for the application have to be sent. Such messages are thus blocked and do not reach the SIM card.

Figure 6A:
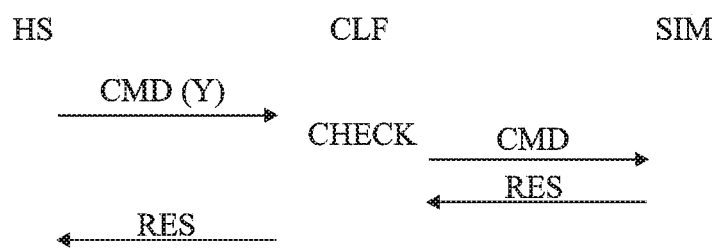
FIGS. 6A and 6B very schematically illustrate an embodiment of a method of protection against the attack illustrated in FIG. 3.
Figure 6B:
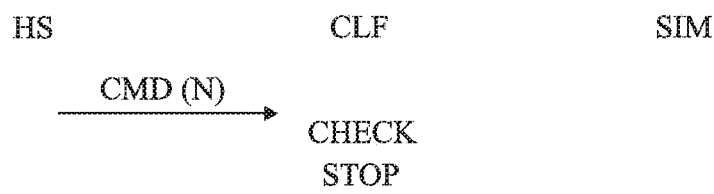

FIGS. 6A and 6B illustrate the operation of the system of FIG. 5, respectively for an authorized control signal (Y) and for a non-authorized control signal (N).

In the example of FIG. 6A, a message or control signal CMD(Y) is sent by the telephone (HS), more specifically by the telephone microcontroller, to the CLF router. It is assumed that this control signal has a format and/or parameters authorized by the filtering table of the router. The router, after having checked (CHECK) in its tables, authorizes the transmission of this control signal to the SIM card. Once the SIM card has received it on its pipe created through the NFC router, it responds (RES) to the microcontroller through the router.

In the example of FIG. 6B, the control signal is assumed to correspond to an unauthorized control signal. The microcontroller of the telephone thus sends this control signal to the SIM card via the CLF router. Said router, by performing the checking steps (CHECK) intercepts this control signal and stops it (STOP). It may here be an attack such as previously described in relation with FIGS. 3 and 4.

The implementation of the described embodiments requires a modification of the internal operation of the CLF router to provide a specific filtering table therein. This implementation is within the abilities of those skilled in the art based on the functional indications given hereabove and by using tools which are usual per se.

Various embodiments have been described. Various alterations and modifications will occur to those skilled in the art. In particular, the embodiments have been described in relation with an example of a security module formed of a SIM card. They however more generally apply to any security module capable of communicating with the NFC router.

Such alterations, modifications, and improvements are intended to be within the spirit and scope of the invention. Accordingly, the foregoing description is by way of example only and is not intended as limiting. The invention is limited only as defined in the following claims and the equivalents thereto.

What is claimed is:

1. A method to protect data stored in a secure data circuit of a telecommunication device equipped with a near-field communication (NFC) router, a microcontroller, and the secure data circuit, the method comprising:
   for all messages received with the NFC router, parsing each message to retrieve a communication pipe identifier and an instruction code;
   comparing the communication pipe identifier and the instruction code to corresponding information in a filter table that is separate from a routing table of the NFC router; and
   when the instruction code of a particular message is an instruction to modify a communication pipe associated with the retrieved communication pipe identifier by reassigning one end of the communication pipe associated with the retrieved communication pipe identifier from a port of the NFC router to a different circuit, blocking the particular message from reaching the secure data circuit when the instruction code is not authorized in the filter table and permitting passage of the particular message to the secure data circuit when the instruction code is authorized in the filter table,
   wherein comparing the communication pipe identifier and the instruction code to corresponding information in the filter table includes comparing a format of data of the particular message with authorized formats stored in the filter table.

2. The method of claim 1, wherein the filter table includes a plurality of authorized instruction codes.

3. The method of claim 1, wherein comparing the communication pipe identifier and the instruction code to corresponding information in the filter table includes:
   comparing a received control signal to corresponding information in the filter table; and
   based on comparing the received control signal, asserting an authorization code or a denial code.

4. The method of claim 1, wherein the particular message includes telecommunication data.

5. A method to protect data stored in a secure data circuit of a telecommunication device equipped with a near-field communication (NFC) router, a microcontroller, and the secure data circuit, the method comprising:
   for all messages received with the NFC router, parsing each message to retrieve a communication pipe identifier and an instruction code;
   comparing the communication pipe identifier and the instruction code to corresponding information in a filter table that is separate from a routing table of the NFC router: and
   when the instruction code of a particular message is an instruction to modify a communication pipe associated with the retrieved communication pipe identifier by reassigning one end of the communication pipe associated with the retrieved communication pipe identifier from a port of the NFC router to a different circuit, blocking the particular message from reaching the secure data circuit when the instruction code is not authorized in the filter table and permitting passage of the particular message to the secure data circuit when the instruction code is authorized in the filter table, wherein the NFC router includes a plurality of filter tables, each one of the plurality of filter tables associated with a different secure data circuit.

6. The method of claim 5, wherein the plurality of filter tables includes at least one filter table associated with the microcontroller.

7. The method of claim 5, comprising:
   intercepting the particular message before the message reaches the secure data circuit.

8. The method of claim 5, wherein the filter table includes a plurality of authorized instruction codes.

9. The method of claim 5, wherein blocking the message is as a result of determining that the instruction code is not included as an authorized instruction code in the filter table.

10. A device, comprising:
    a secure data circuit;
    a microcontroller; and
    a contactless front-end (CLF) router communicatively arranged between the secure data circuit and the microcontroller, the device arranged to form a communication pipe between a port of the secure data circuit and a port of the CLF router, wherein the CLF router is configured to:
    receive a plurality of messages;
    parse the plurality of messages to retrieve a channel identifier of the communication pipe and an instruction code for each parsed message; and
    when a particular instruction code is an instruction to divert a particular communication pipe by reassigning one end of the particular communication pipe from the port of the CLF router to a different circuit, the CLF router is configured to compare the respective channel identifier and the respective instruction code to corresponding information in a filter table that is separate from a routing table of the CLF router, and based on the comparison, the CLF router is arranged to block the respective message from reaching the secure data circuit when the instruction code is not authorized in the filter table and the CLF router is arranged to permit passage of the respective message to the secure data circuit when the instruction code is authorized in the filter table,
    wherein comparison between the respective channel identifier and the respective instruction code to corresponding information in the filter table includes comparison between a format of the instruction code to authorized formats stored in the filter table.

11. The device of claim 10, wherein the device is a telecommunication device.

12. The device of claim 10, wherein CLF router conforms to a near-field communication protocol.

13. The device of claim 10, wherein comparing the respective channel identifier and the respective instruction code to corresponding information in the filter table includes:
    comparing a format of the instruction code to authorized formats stored in the filter table.

14. The device of claim 10, where the CLF router is further arranged to:
    assert an authorization code or a denial code.

15. A device, comprising:
    a secure data circuit:
    a microcontroller; and a contactless front-end (CU) router communicatively arranged between the secure data circuit and the microcontroller, the device arranged to form a communication pipe between a port of the secure data circuit and a port of the CLF router, wherein the CLF router is configured to:

receive a plurality of messages;

parse the plurality of messages to retrieve a channel identifier of the communication pipe and an instruction code for each parsed message; and when a particular instruction code is an instruction to divert a particular communication pipe by reassigning one end of the particular communication pipe from the port of the CLF router to a different circuit, the CLF router is configured to compare the respective channel identifier and the respective instruction code to corresponding information in a filter table that is separate from a routing table of the CLF router and based on the comparison, the CLF router is arranged to block the respective message from reaching the secure data circuit when the instruction code is not authorized in the filter table and the CLF router is arranged to permit passage of the respective message to the secure data circuit when the instruction code is authorized in the filter table, wherein the CLF router is formed in at least one of a universal serial bus (USB) key, a bank teller terminal, and an adhesive device.

16. The device of claim 15, wherein the CLF router includes memory that stores the filter table.

17. The device of claim 15, wherein the CLF router includes an interception module disposed along a path between the microcontroller and the secure data circuit, the interception module configured to intercept the instruction to divert the particular communication pipe.

18. The device of claim 15, wherein the CLF router conforms to a near-field communication protocol.

19. A device comprising:
a secure data circuit;
a microcontroller; and
a contactless front-end (CLF) router communicatively arranged between the secure data circuit and the microcontroller, the device arranged to form a communication pipe between a port of the secure data circuit and a port of the CLF router, wherein e CLF router is configured to:

receive a plurality of messages;

parse the plurality of messages to retrieve a channel identifier of the communication pipe and an instruction code for each parsed message; and when a particular instruction code is an instruction to divert a particular communication pipe by reassigning one end of the particular communication pipe from the port of the CLF router to a different circuit, the CLF router is configured to compare the respective channel identifier and the respective instruction code to corresponding information in a filter table that is separate from a routing table of the CLF router, and based on the comparison, the CLF router is arranged to block the respective message from reaching the secure data circuit when the instruction code is not authorized in the filter table and the CLF router is arranged to permit passage of the respective message to the secure data circuit when the instruction code is authorized in the filter table, wherein the CLF router includes memory that stores a plurality of filter tables, each one of the plurality of filter tables associated with a different secure data circuit.

20. The device of claim 19, wherein the CLF router includes memory that stores the filter table.

21. The device of claim 19, wherein the CLF router includes an interception module disposed along a path between the microcontroller and the secure data circuit, the interception module configured to intercept the instruction to divert the particular communication pipe.

22. The device of claim 19, wherein the CLF router conforms to a near-field communication protocol.

23. A method performed in a device, comprising:
forming a communication pipe between a secure data circuit and a near-field communication (NFC) router;
receiving a message with the NFC router;
filtering the message by isolating an instruction code in the message and a channel identifier, wherein the instruction code is an instruction to modify the communication pipe by reassigning one end of the communication pipe from a port of the NFC router to a different circuit; and
either blocking the message from reaching the secure data circuit when the channel identifier identifies the communication pipe and when the instruction code is not authorized to act on the communication pipe based at least in part on comparison of the instruction code with information in a filter table that is separate from a routing table of the NFC router, or passing the message toward the secure data circuit when the channel identifier identifies the communication pipe and when the instruction code is authorized to act on the communication pipe, wherein comparison between the instruction code with the information in the filter table includes comparison between a format of data of the message and authorized formats stored in the filter table.

24. The method of claim 23, comprising:
blocking the message as a result of determining that the instruction code is not recognized.

25. The method of claim 23, wherein the message is addressed to the secure data circuit.

26. The method of claim 23, wherein each operation of parsing, determining, comparing, and blocking is performed by the NFC router.

27. The method of claim 23, comprising:
forming in the device a second communication pipe between a second secure data circuit and the NFC router;
receiving a second message with the NFC router;
filtering the second message by isolating a second instruction code in the message and a second channel identifier; and
blocking the second message when the second channel identifier identifies the second communication pipe and when the second instruction code is not authorized to act on the second communication pipe.

28. The method of claim 23, comprising:
comparing a received control signal to corresponding information in the filter table; and
based on comparison between the received control signal and the corresponding information, asserting an authorization code or a denial code.

29. The method of claim 23, comprising: intercepting the message before the message is transmitted to the different circuit.

30. The method of claim 23, wherein the different circuit is the secure data circuit and the instruction code is an instruction to modify the communication pipe by reassigning one end of the communication pipe from the port of the NFC router to a port of the security data circuit.

31. The method of claim 23, wherein comparing the communication pipe identifier and the instruction code to corresponding information in the filter table includes: comparing a received control signal to corresponding information in the filter table; and as a result of comparing the received control signal, generating an authorization code or a denial code.

* * * * *

UNITED STATES PATENT AND TRADEMARK OFFICE
CERTIFICATE OF CORRECTION

PATENT NO. : 10,511,626 B2  
APPLICATION NO. : 15/585107  
DATED : December 17, 2019  
INVENTOR(S) : Thierry Huque et al.

Page 1 of 1

It is certified that error appears in the above-identified patent and that said Letters Patent is hereby corrected as shown below:

In the Claims

Column 11, Line 1:
"a contactless front-end (CU) router communicatively"
Should read:
--a contactless front-end (CLF) router communicatively--.

Column 11, Line 19:
"that is separate from a routing table of the CLF router"
Should read:
--that is separate from a routing table of the CLF router,--.

Column 11, Line 39:
"19. A device comprising:"
Should read:
--19. A device, comprising:--.

Column 11, Line 46:
"a port of the CLF router, wherein e CLF router is"
Should read:
--a port of the CLF router, wherein the CLF router is--.

Signed and Sealed this  
Fifth Day of May, 2020

Andrei Iancu  
*Director of the United States Patent and Trademark Office*